US007721331B1

(12) United States Patent
Rowe

(10) Patent No.: US 7,721,331 B1
(45) Date of Patent: May 18, 2010

(54) METHODS AND APPARATUS FOR PERFORMING A PRE-PROCESSING ACTIVITY

(75) Inventor: Edward R. Rowe, Sunnyvale, CA (US)

(73) Assignee: Adobe Systems Inc., San Jose, CA (US)

( * ) Notice: Subject to any disclaimer, the term of this patent is extended or adjusted under 35 U.S.C. 154(b) by 1140 days.

(21) Appl. No.: 11/132,595

(22) Filed: May 19, 2005

(51) Int. Cl.
G06F 11/00 (2006.01)
(52) U.S. Cl. .............................. 726/22; 726/23; 726/24; 726/25; 709/221; 709/225; 713/182; 717/176
(58) Field of Classification Search ............ 726/22–25, 726/27, 17, 4, 14, 9, 5; 713/200, 182, 185, 713/168, 186, 189, 170, 172, 167, 171, 193, 713/156, 155, 188, 194; 707/10, 200, 1, 707/7, 2, 204; 380/46; 709/221, 225; 717/176
See application file for complete search history.

(56) References Cited

U.S. PATENT DOCUMENTS

| 6,763,466 | B1* | 7/2004 | Glover ....................... 726/24 |
| 2002/0157089 | A1* | 10/2002 | Patel et al. .................. 717/178 |
| 2003/0079145 | A1* | 4/2003 | Kouznetsov et al. ........ 713/200 |
| 2005/0283837 | A1* | 12/2005 | Olivier et al. ................. 726/24 |
| 2006/0095965 | A1* | 5/2006 | Phillips et al. ................ 726/22 |

* cited by examiner

Primary Examiner—Taghi T Arani
Assistant Examiner—Jason Lee
(74) Attorney, Agent, or Firm—Chapin IP Law, LLC

(57) ABSTRACT

A system performs a pre-processing activity by identifying at least one file requiring a pre-processing activity to be performed prior to the file(s) being accessed by an application operating on a computerized device. The system schedules the pre-processing activity on the file(s) prior to receiving an invocation of the application that accesses the file(s). The pre-processing activity is scheduled to minimize a performance impact on the computerized device. The system then performs the pre-processing activity on the file(s) in accordance with the scheduling.

26 Claims, 9 Drawing Sheets

METHODS AND APPARATUS FOR PERFORMING A PRE-PROCESSING ACTIVITY

BACKGROUND

Conventional computerized devices, such as personal computers, laptop computers, and data communications devices (e.g., routers, switches, gateways and the like) exchange data over networks using a variety of communications mechanisms. In an attempt to prevent malicious attacks to such computer systems, it is often necessary to have anti-virus or other hostile program detection, elimination and/or prevention applications in operation on such computers to remove or quarantine malicious programs. Generally, such malicious programs can includes viruses, worms, Trojan horse programs, spyware, spamware and other unwanted programs that, if executed on a computer, can compromise the integrity or use of the computer system in many ways. Conventional detection and protection programs such as anti-virus software operate to identify and remove or disinfect the malicious code from an infected computer and make attempts to avoid infection all together.

As an example, conventional anti-virus software operates to scan files on a computer to detect and eliminate viruses or other malicious code. The anti-virus software examines files to look for known viruses by referencing a virus dictionary (i.e., a compiled list of known virus signatures). The anti-virus software can also identify suspicious behavior from a file such as suspicious program behavior that potentially might indicate a file associated with the program is infected with a virus. Anti-virus software can be scheduled to run on-demand during the booting-up process of the computer, during the launching of applications (such as during startup of an email utility, work processor, or other program), or can even be scheduled to run at a specific time (i.e., every Tuesday and Thursday at 3 pm). Typically, a file cannot be in use (e.g., open) during the scanning of that file by anti-virus software.

SUMMARY

Conventional technologies for operation of pre-processing activities such as anti-virus software suffer from a variety of deficiencies. In particular, conventional technologies for running anti-virus software on demand are limited in that the launch time of an application is often adversely affected by the time taken by on-demand virus checking of the files that the application uses when it launches. This can slow down application launch significantly and adversely affects users perceived performance of such applications. For example, a virus scan can be performed on a word processing application upon boot up of the computer, in which case, the boot up time of the computer is extended until the virus scan is completed. The virus scan can also be performed when the user invokes the word processing application, but, again, the time required to open the word processing application will be extended by the amount of time the virus scan requires to complete.

Another problem with conventional operation of pre-processing activities such as virus scanning software is that the processing capacity utilized by conventional virus checking software or other pre-processing activities can impact the processing capabilities of other applications (i.e., printing, other user applications, etc). As an example, a virus scan software program running on file "A" can slow down the processing capabilities of the central processing unit (CPU) to the extent that the printing of file "B" is temporarily delayed.

Embodiments disclosed herein significantly overcome such deficiencies and provide a scheduling process that operates in a computer system (either as a separate application or as part of an operating system). The scheduling process schedules and invokes operation of pre-processing activities such as virus checking in a manner that minimizes performance impact of such pre-processing activities on the computer system and on applications that require such pre-processing activities prior to their invocation and operation. The scheduling process identifies a file requiring a pre-processing activity (i.e., a virus scan) on the computer system. The scheduling process then schedules the pre-processing activity on the identified file(s) on the computer system such that performance of the preprocessing activity minimizes impact on an application that requires access to those files. The scheduling process performs the pre-processing activity on the file(s) prior to any request to invoke the application associated with the files (e.g., prior to a user operating the application that will require access to those files). In this manner, at a later time when a user or other process invokes the application associated with (i.e., that requires access to) the files, the pre-processing activity will have already taken place and will not be required at application launch time. Thus the launch or startup of an application that requires access to those files will not require the pre-processing activity at start time since pre-processing such as virus checking was done beforehand. In one configuration, the system disclosed herein amortizes the performance hit of the pre-processing activity little by little during background processing such that all or some of the pre-processing activity can be completed prior to operation of an application or other processing event that requires the pre-processing activity to be performed.

During an example operation of one embodiment, suppose a software application, such as a word processor, residing on a computer, requires a pre-processing activity, such as virus scanning. The scheduling process identifies all the files required to open, launch, run or otherwise perform or execute an instance of the word processor and in response, schedules the pre-processing activity such as virus scanning of all those files based on the current load on the computer and the frequency and duration of use of the word processor on that computer. The scheduling process schedules the virus scanning process before the user invokes the word processor such that, when the user is ready to invoke the word processor, the word processor application and all associated files have already been scanned for viruses.

The files associated with the word processor are identified earlier in the scheduling process during the generation and execution of a file compilation process. The file compilation process is performed after or during installation of the word processor on the computer, and once the word processor is installed, the file compilation process executes the word processor. During the execution of the word processor, the file compilation process monitors the execution and records the names of the files accessed by the word processor. The file names are converted from variable file names (i.e., machine dependent file names) to fixed path names (i.e., machine independent file names) during generation of the file compilation process. The fixed path file names are then run through a file filtering process, where some of the fixed path file names may be removed, based on a set of pre-defined rules. The files that are removed are files that do not need to be scanned for viruses during the scanning process. These might be, for example, temporary files generated during the invocation of the word processor, but that are deleted once the word processor is closed.

In one embodiment, the file compilation process (containing fixed path file names of the files accessed by the word processor during execution) is executed on a computer system other than the computer system on which the file compilation process was generated. During execution of the file compilation process, the fixed path file names are decoded to create variable path file names that are unique to the computer system on which the file compilation process is executed.

In one configuration, the scheduling process is adaptive and the scheduler is an adaptive scheduler. In such a configuration, once the scheduling process has determined which files associated with the word processor require pre-processing activity, the scheduling process schedules the pre-processing activity based on the resource load on the computer, and the demand of the identified files in need of the pre-processing activity. As an example, when the load on the computer is below a pre-defined threshold, the scheduling process begins the pre-processing activity on one (or more in an alternative embodiment) of the files identified as requiring pre-processing activity. The scheduling process also monitors usage of the identified file to determine how often the identified file is in use, and how long the identified file is in use. By tracking the usage of the file, the scheduling process statistically determines when the identified file is likely to be used, and performs the pre-processing activity on the identified file prior to its use. As a result of the system disclosed herein, when the user opens the word processor, the word processor application, and all the files associated with the word processor have already been scanned for viruses and thus the word processor opens more quickly than in conventional systems where the user must wait for the virus scan to be completed on files associated with the word processor. It is to be understood that a word processor application is used in the above examples and elsewhere in this document by way of example only, and that any type of application can be the application for which pre-processing activities such as virus checking can be performed well before launch or other access is made to such application.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features disclosed herein may be employed in data communications devices and other computerized devices and software systems for such devices such as those manufactured by Adobe Systems, Inc. of San Jose, Calif.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments disclosed herein include a computer system that performs a scheduling process. The scheduling process schedules and invokes operation of pre-processing activities such as virus checking in a manner that minimizes performance impact of such pre-processing activities on the computer system and on applications that require such pre-processing activities by performing such pre-processing activities in a non-intrusive manner well before invocation of an application that requires such pre-processing to have been performed. The scheduling process identifies files on the computer system requiring pre-processing activity, and schedules the pre-processing activity on the identified files, taking into account the resource load on the computer system, and the user demand of the identified files requiring pre-processing activity. The files requiring pre-processing activity are identified via a file compilation process that executes software applications on the computer system, and monitors the files accessed during the execution of the software application. Some of the files accessed during the execution of the software application are the files that are later identified as requiring pre-processing activity.

Figure 1:
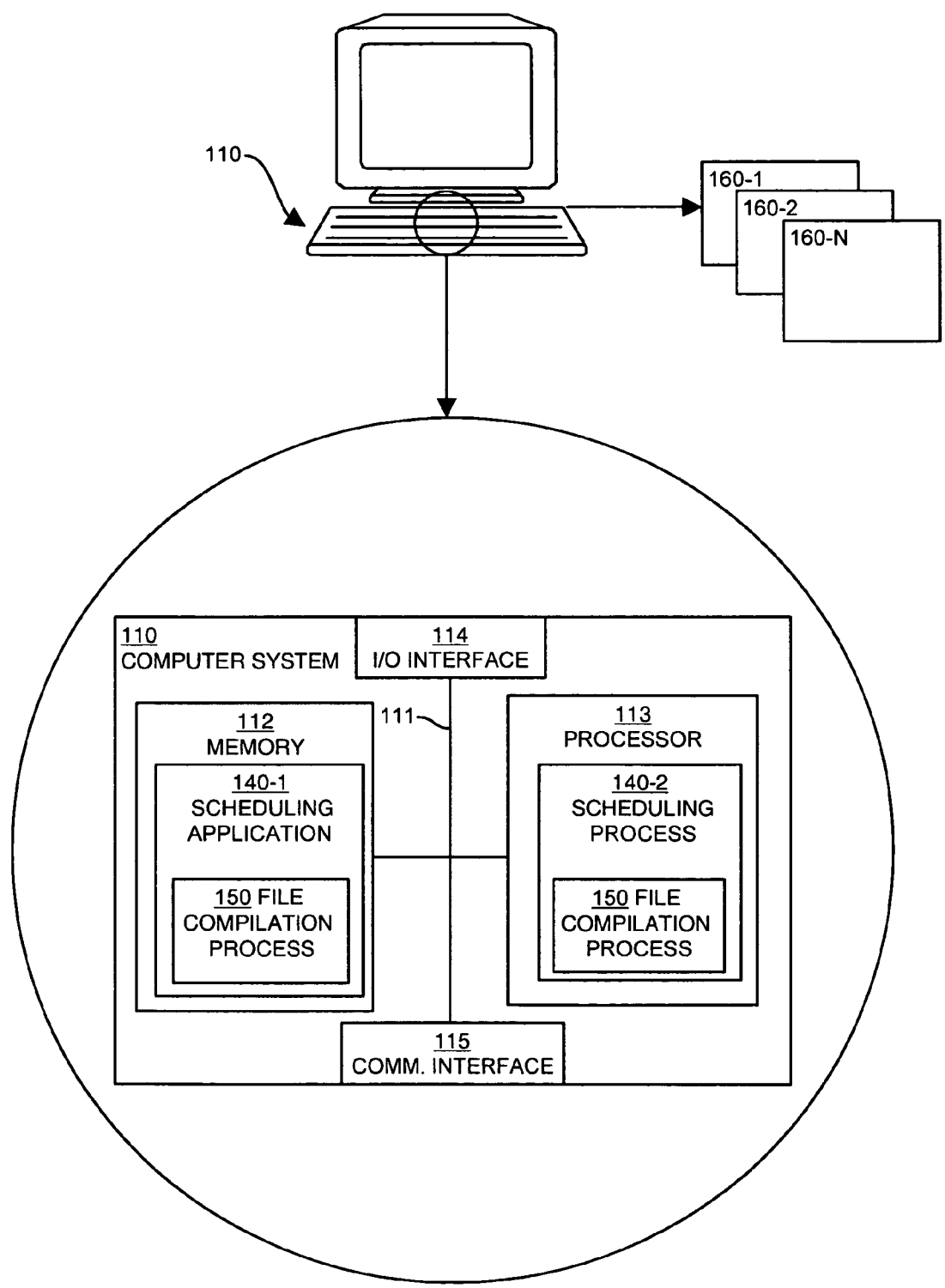
FIG. 1 shows a high-level block diagram of a computer system according to one embodiment disclosed herein.

FIG. 1 is a block diagram illustrating example architecture of a computer system 110 that executes, runs, interprets, operates or otherwise performs a scheduling application 140-1 and scheduling process 140-2 that includes a file compilation process 150 suitable for use in explaining example configurations disclosed herein. The computer system 110, containing files requiring pre-processing activity 160-N, may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with a scheduling application 140-1 that includes a file compilation process 150 identifying the files requiring pre-processing activity 160-N as explained herein. The scheduling application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the scheduling application 140-1. Execution of scheduling application 140-1 in this manner produces processing functionality in a scheduling process 140-2. In other words, the scheduling process 140-2 represents one or more portions or runtime instances of the scheduling application 140-1 (or the entire scheduling application 140-1) performing or executing within or upon the processor 113 in the computerized device 110 at runtime. The file compilation process 150 is included in this processing and operates as explained herein to identify files requiring pre-processing activity 160-N.

It is noted that example configurations disclosed herein include the scheduling application 140-1 itself including the file compilation process 150 (i.e., in the form of un-executed or non-performing logic instructions and/or data). The scheduling application 140-1 may be stored on a computer readable medium (such as a floppy disk), hard disk, electronic, magnetic, optical, or other computer readable medium. The scheduling application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the scheduling application 140-1 in the processor 113 as the scheduling process 140-2 including the file compilation process 150. Those skilled in the art will understand that the computer system 110 may include other processes and/or software and hardware components, such as an operating system not shown in this example.

Further details of configurations explained herein will now be provided with respect to a flow chart of processing steps that show the high level operations disclosed herein to perform the scheduling process 140-2.

Figure 2:
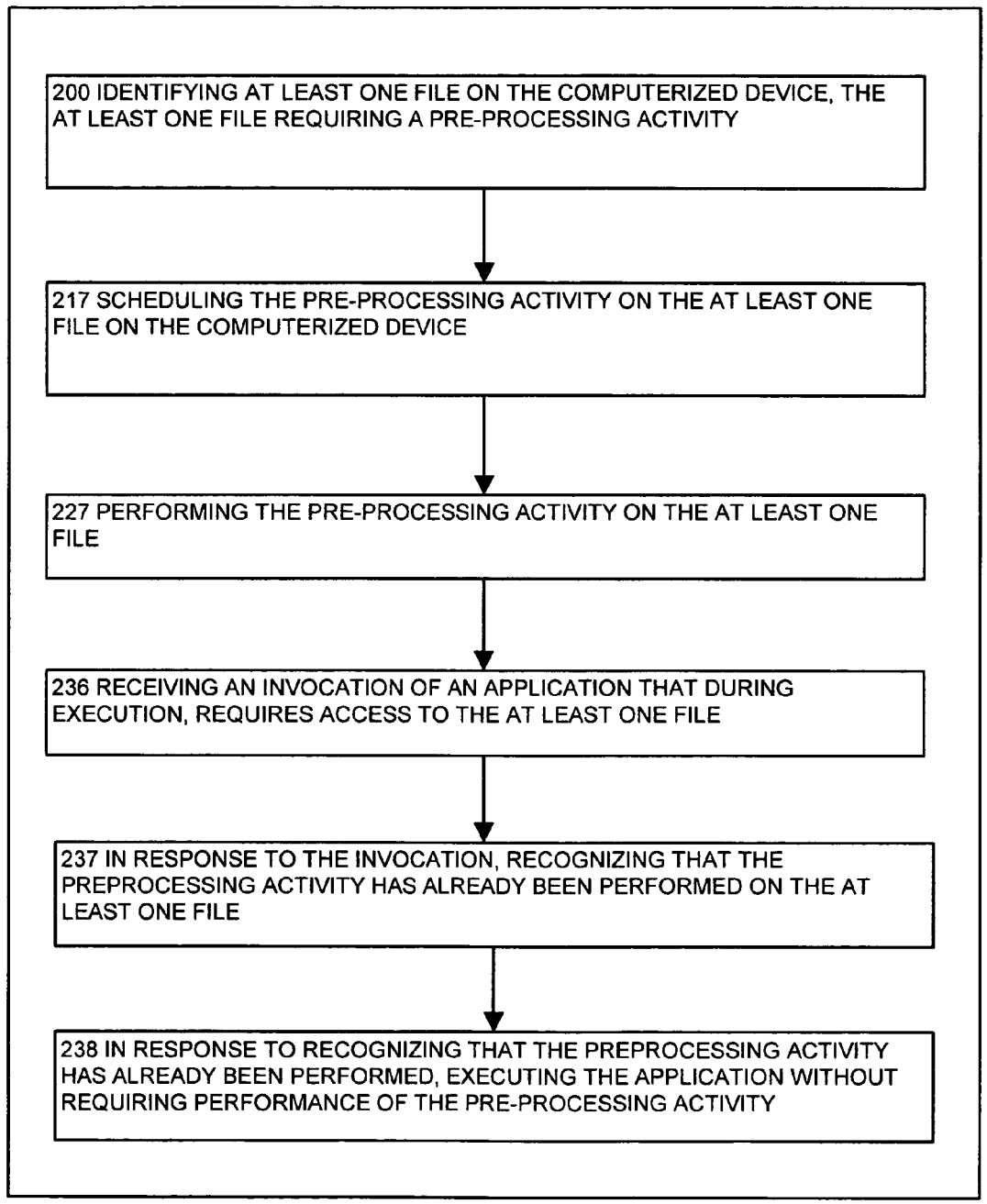
FIG. 2 illustrates a flowchart of a procedure performed by the system of FIG. 1 when the scheduling process identifies at least one file requiring a pre-processing activity on the computerized device, according to one embodiment disclosed herein.

FIG. 2 is a flowchart of the steps performed by the scheduling process 140-2 when it identifies at least one file requiring pre-processing activity 160-1 on the computer system 110. The scheduling process 140-2 identifies files requiring pre-processing activity 160-N on the computer system 110, and schedules the pre-processing activity such that, when a user invokes the identified file (or invokes an application that accesses the identified file during the start up of the application), the identified file and all files associated with the application, have already completed the pre-processing activity. Thus, the user is not delayed by the execution of the pre-processing activity.

In step 200, the scheduling process 140-2 identifies at least one file, the at least one file requiring a pre-processing activity 160-1 to be performed prior to the at least one file being accessed by an application operating on the computer system 110. The scheduling process 140-2 identifies the files requiring a pre-processing activity 160-N during the file compilation process 150, the details of which will be further explained below.

In step 217, the scheduling process 140-2 schedules the pre-processing activity 160-1 the at least one file prior to receiving an invocation of the application that accesses the at least one file, the pre-processing activity 160-1 being scheduled to minimize a performance impact on the computer system 110. The scheduling process 140-2 determines a time when the resource load on the computer system 110 is low, and performs the scheduling process 140-2 when the computer system 110 is not busy performing other processing activities. The scheduling process 140-2 also statistically determines which application a user is most likely to access, and schedules the pre-processing activity on that application, and on the files associated with that application. The goal is to schedule the pre-processing activity on the files prior to a user accessing those files, saving the user the time necessary to complete the pre-processing activity prior to using those files.

In step 227, the scheduling process 140-2 performs the pre-processing activity 160-1 on the at least one file in accordance with the scheduling. The pre-processing activity can be any sort of processing activity, such as running a virus scan that is performed prior to the use of an application or files associated with an application.

Alternatively, in one embodiment, in step 236, the scheduling process 140-2 receives an invocation of an application that, during execution, requires access to the file. For example, a user attempts to open an application, such as a word processor, that, in turn, calls several different libraries.

In step 237, the scheduling process 140-2 in response to the invocation, recognizes that the pre-processing activity has already been performed on the file. For example, the scheduling process 140-2 might recognize that a virus scan has already been performed on the file, or that the libraries required to run the application, have been verified as having up to date revision numbers.

In step 238, the scheduling process 140-2, in response to recognizing that the preprocessing activity has already been performed, executes the application without requiring execution of the pre-processing activity. In this example, the application, such as a word processor, would open immediately, and the user would not have to wait for the pre-processing activity (i.e., virus scan, version verification/update) to complete.

Figure 3:
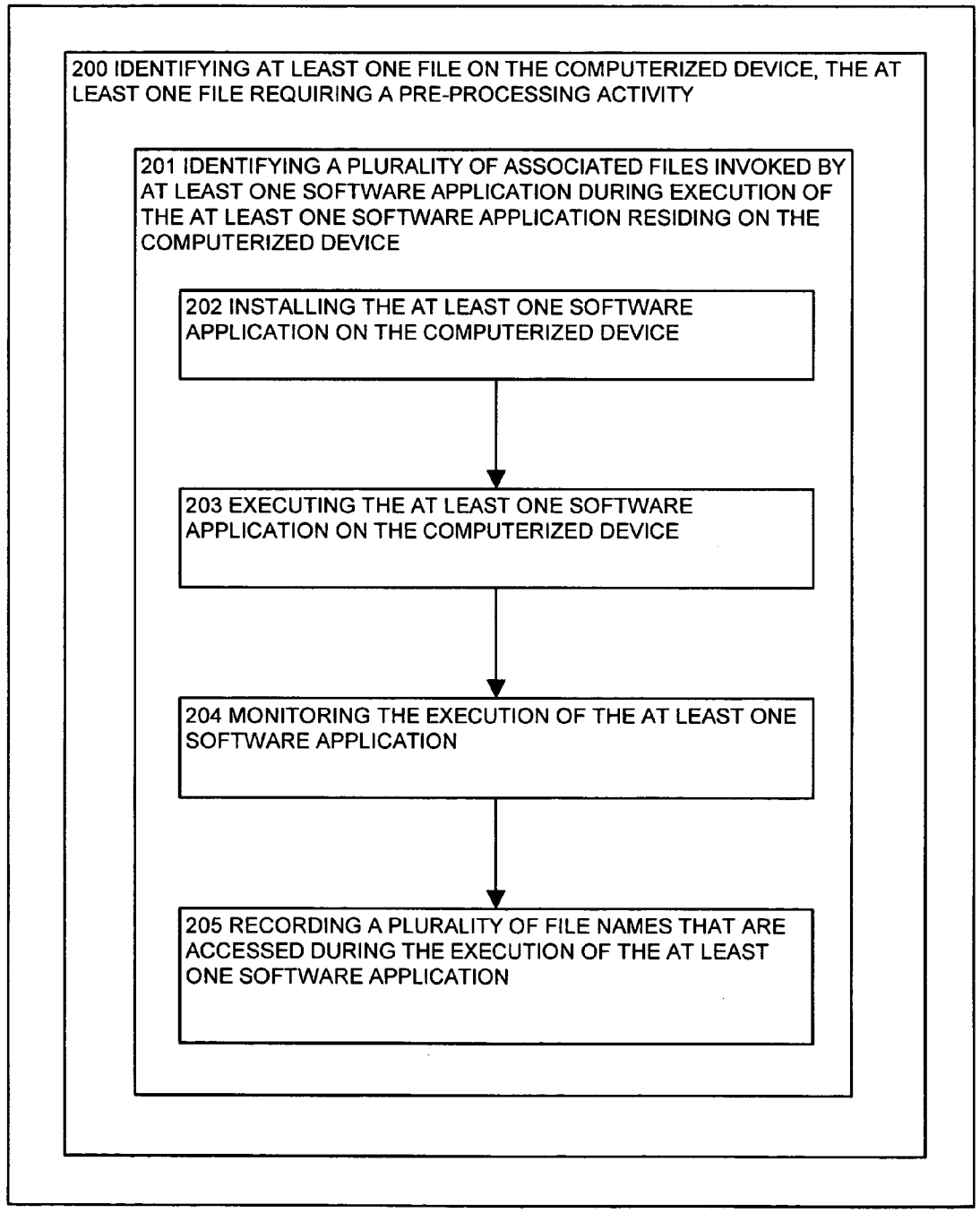
FIG. 3 illustrates a flowchart of a procedure performed by the system of FIG. 1 when the scheduling process identifies at least one file requiring a pre-processing activity on the computerized device, according to one embodiment disclosed herein.

FIG. 3 is a flowchart of the steps performed by the scheduling process 140-2 when it identifies a plurality of associated files (i.e., the files requiring a pre-processing activity 160-N) invoked by at least one software application during execution of the software application residing on the computer system 110, and more specifically, the steps performed to compile the list of associated files, and to determine which of the associated files are files requiring a pre-processing activity 160-N.

In step 201, the scheduling process 140-2 identifies a plurality of associated files invoked by the software application during execution of the software application residing on the computer system 110. Files associated with the software application during execution of the software application can be include files, libraries, help files, etc.

In step 202, the scheduling process 140-2 installs the software application on the computer system 110. In one embodiment, the software application installed is the latest version of the software application bundled into the latest software release.

In step 203, the scheduling process 140-2 executes the software application on the computer system 110. During the execution of the software application, several test scenarios might be executed to mimic typical usage of the software application.

In step 204, the scheduling process 140-2 monitors the execution of the software application to obtain a representative sample of the files that are invoked during the execution of the software application.

In step 205, the scheduling process 140-2 records a plurality of file names that are accessed during the execution of the software application. The plurality of file names that are accessed during the execution of the software application represent any file that is opened, referenced, etc during the execution of the software application.

Figure 4:
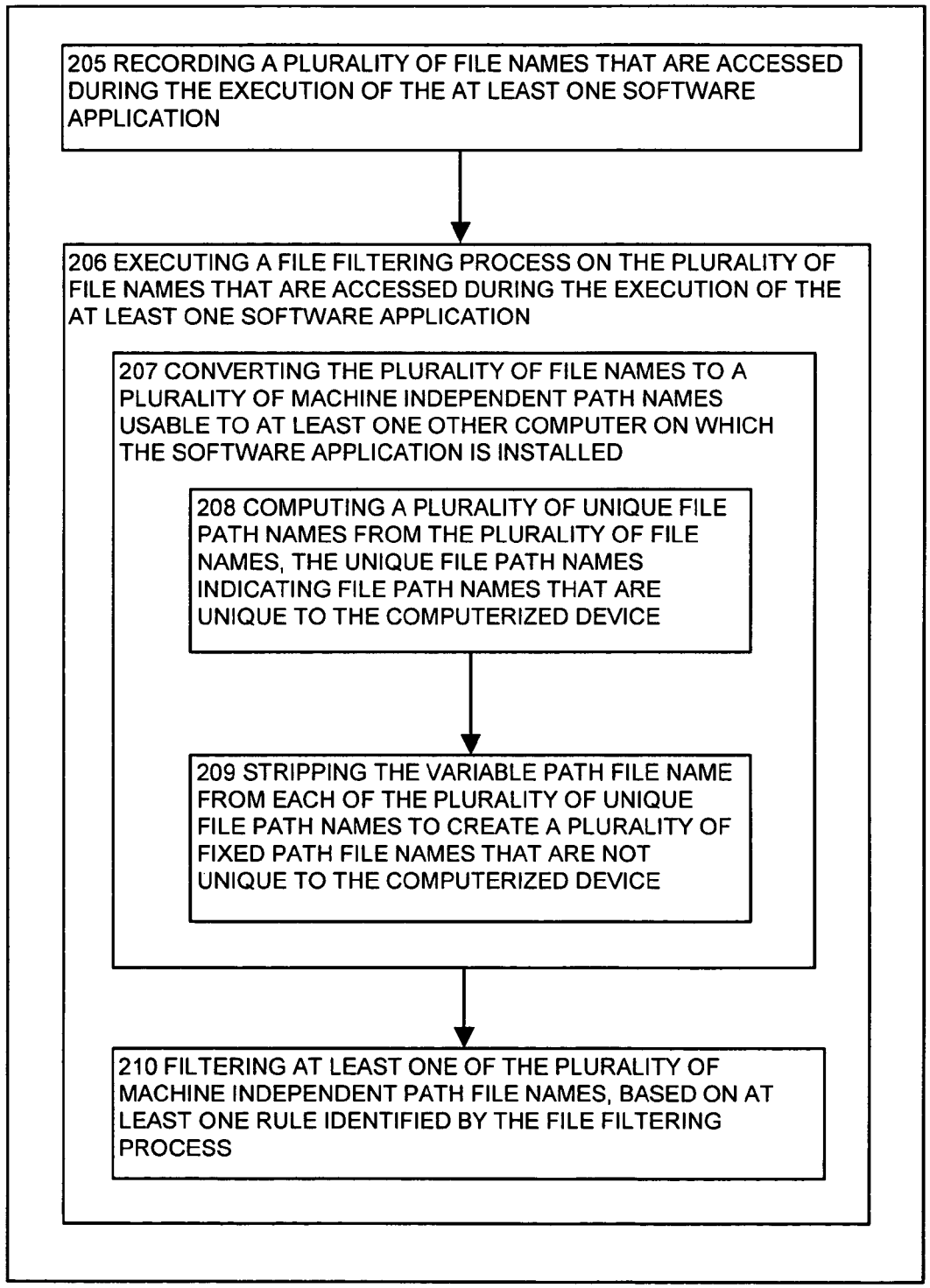
FIG. 4 illustrates a flowchart of a procedure performed by the system of FIG. 1 when the scheduling process executes a file filtering process on the plurality of file names that are accessed during the execution of the at least one software application, according to one embodiment disclosed herein.

FIG. 4 is a flowchart of the steps performed by the scheduling process 140-2 when it records a plurality of file names that are accessed during the execution of the at least one software application and, more specifically, details the steps performed by the file compilation process 150 to process the plurality of file names to obtain the list of files requiring a pre-processing activity 160-N.

In step 206, the file compilation process 150 executes a file filtering process on the plurality of file names that are accessed during the execution of the software application. The plurality of file names that is accessed during the execution of the software application is machine dependent to the computer system 110 on which the software application was executed.

In step 207, the file compilation process 150 converts the plurality of file names to a plurality of machine independent path names (or fixed path names) usable to at least one other computer on which the software application is installed. In other words, the file compilation process 150 converts the plurality of file names that are machine dependent to the computer system 110, to a plurality of machine independent path names that are machine independent to any computer system.

In step 208, the file compilation process 150 computes a plurality of unique file path names from the plurality of file names, the unique file path names indicating file path names that are unique to the computer system 110. Each of the plurality of file names is comprised of a variable path file name and a fixed path file name. The variable path name portion of the file name might indicate a special pre-fix path that is unique to the computer system 110. For example, a user might install a word processor in the "C:\Windows\Applications\" directory. Therefore, a word processor executable file, for example, "Word.exe", might have a path name of: "C:\Windows\Applications\Company\WordProcessor\Word.exe". The fixed path name portion of the file name indicates a path name that is consistent on all the computers that have installed the software application, in this example, "Company\WordProcessor\Word.exe". The "C:\Windows\Applications\" portion of the path name is the variable path name, because another user might install a word processor in a different directory on a different computer. The "Company\WordProcessor\Word.exe" portion of the path name is the fixed path name because all users installing a word processor would have a fixed path name of "Company\WordProcessor\Word.exe".

In step 209, the file compilation process 150 strips the variable path file name from each of the plurality of unique file path names to create a plurality of fixed path file names (or machine independent path names) that are not unique to the computer system 110. The variable path file names indicate the exact path name of the file on the computer system 110. Stripping the variable path name from each of the plurality of unique file path names results in a plurality of fixed path names, indicating path names of files that are the same on any computer on which the software application is installed. In one embodiment, the variable portion of the pathname is replaced with an identifier that represents the variable portion. For example, "c:\windows\applications" might be replaced with |WIN|.

In step 210, the file compilation process 150 filters at least one of the plurality of fixed path file names, based on at least one rule identified by the file filtering process. For example, the file filtering process executes a list of rules contained within a configuration file. The execution of the rules may result in some of the fixed path names being deleted, meaning those fixed path names have not been identified as files requiring a pre-processing activity.

Figure 5:
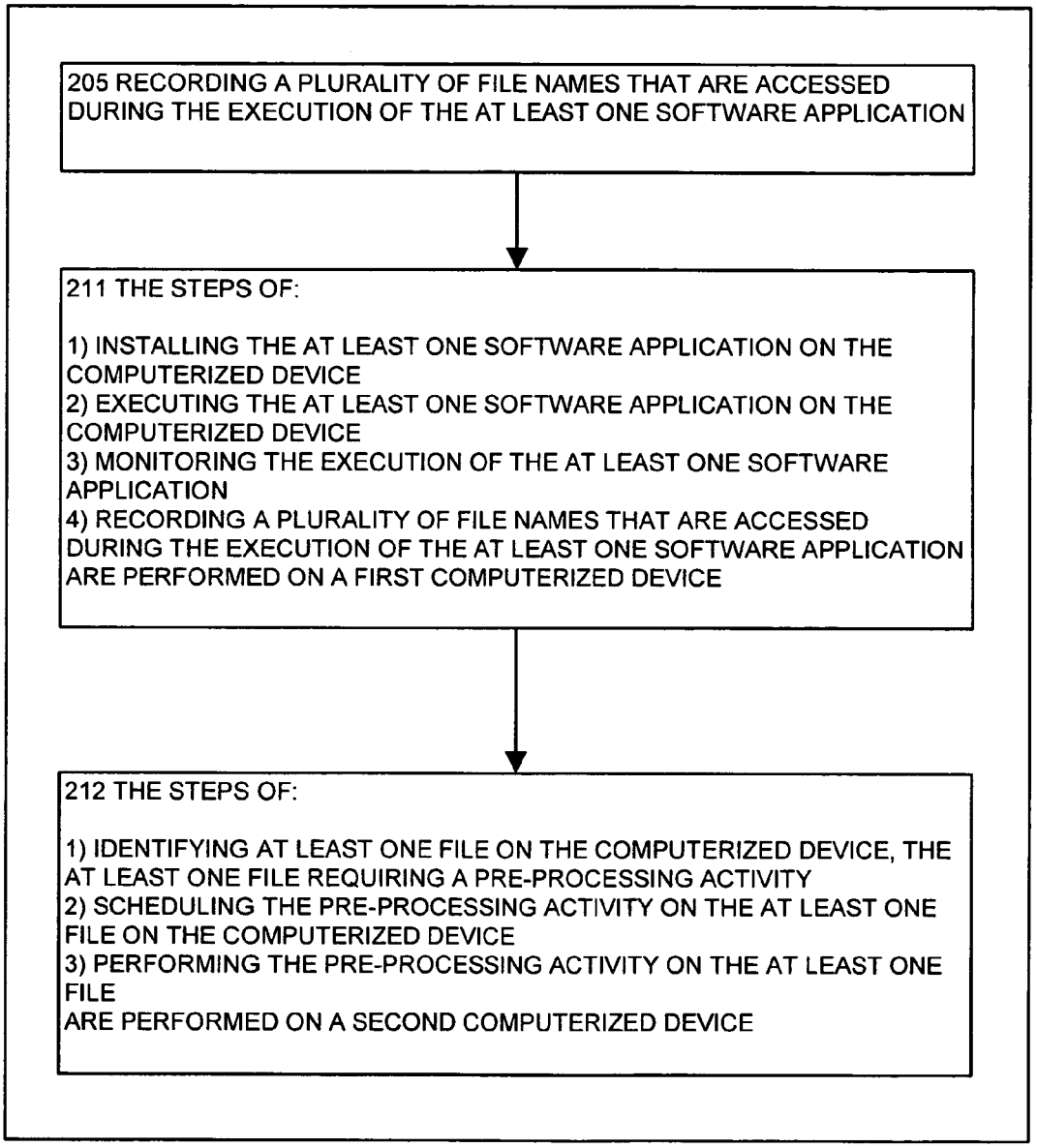
FIG. 5 illustrates a flowchart of a procedure performed by the system of FIG. 1 when the scheduling process records a plurality of file names that are accessed during the execution of the at least one software application, according to one embodiment disclosed herein.

FIG. 5 is a flowchart of the steps performed by the scheduling process 140-2 when it records a plurality of file names that are accessed during the execution of the software application. In one embodiment, the steps of identifying the files requiring a pre-processing activity 160-N, scheduling the files requiring a pre-processing activity, and performing the pre-processing activity on the files requiring a pre-processing activity 160-N are performed on a first computerized device, and the steps of creating the list of identified files are performed on a second computerized device.

In step 211, the scheduling process 140-2 performs the steps of installing the software application on the computer system 110, executing the software application on the computer system 110, monitoring the execution of the software application, and recording a plurality of file names that are accessed during the execution of the software application, on a first computerized device. In one embodiment, the software installed on the first computerized device is from a software build release. When the list of files requiring a pre-processing activity 160-N has been compiled, that list is incorporated back into the build release so that, when a second computerized device loads the software build, within the software build are all the files requiring a pre-processing activity 160-N, corresponding to that software build.

In step 212, the scheduling process 140-2 performs the steps of identifying at least one file on the computer system 110, the file requiring a pre-processing activity 160-1, scheduling the pre-processing activity on the file requiring a pre-processing activity 160-1 on the computer system 110, and performing the pre-processing activity on the file requiring a pre-processing activity 160-1 on a second computerized device.

Figure 6:
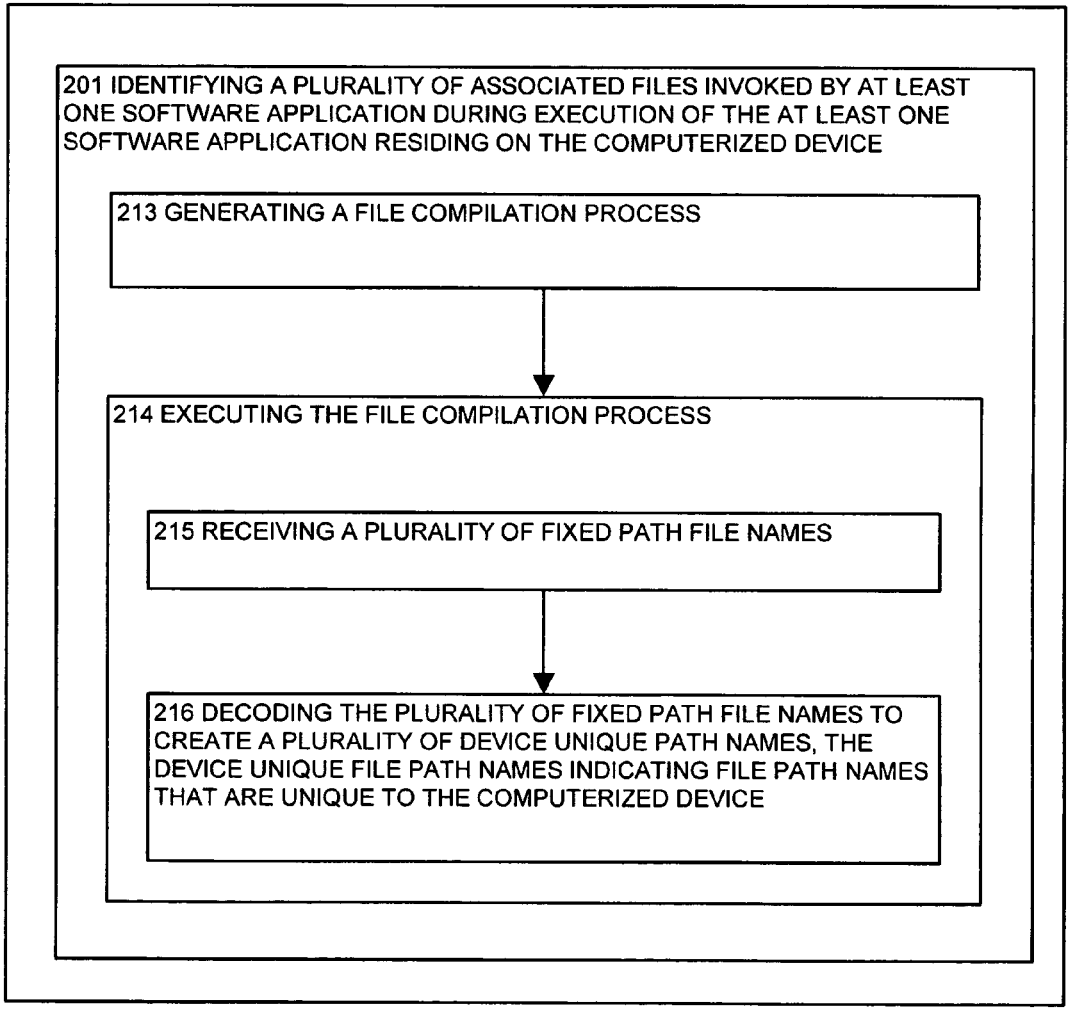
FIG. 6 illustrates a flowchart of a procedure performed by the system of FIG. 1 when the scheduling process identifies a plurality of associated files invoked by at least one software application during execution of the at least one software application residing on the computerized device, according to one embodiment disclosed herein.

FIG. 6 is a flowchart of the steps performed by the scheduling process 140-2 when it identifies a plurality of associated files invoked by at least one software application during execution of the software application residing on the computer system 110. A file compilation process is generated to create the list of associated files, and the file compilation process is executed to generate a list of associated files unique to the computer that executed the file compilation process. When the generation of the list of associated files is complete, the resulting list of associated files becomes the files requiring a pre-processing activity 160-N.

In step 213, the scheduling process 140-2 generates a file compilation process. The file compilation process is created by determining which files are associated with a software application when the software application is. Running the software application in various test scenarios, and recording the files that are accessed during the execution of the software application create the file compilation process.

In step 214, the scheduling process 140-2 executes the file compilation process. Executing the file compilation process generates the list of files requiring a pre-processing activity 160-N that are unique to the computer on which the file compilation process was executed. Details related to executing the file compilation process will be further explained within the sub steps of 215 and 216.

In step 215, the scheduling process 140-2 receives a plurality of machine independent path file names. The plurality of machine independent path names was compiled during the generation of the file compilation process. The plurality of machine independent path names is a result of executing the software application, monitoring the files accessed during the execution, and stripping the fixed path names from those files name to create fixed path names that are machine independent (i.e. the fixed path names that are the same, regardless in which directory on the computerized device, the software application was installed).

In step 216, the scheduling process 140-2 decodes the plurality of machine independent path file names to create a plurality of device unique path names, the device unique file path names indicating file path names that are unique to the computerized device. The machine independent path names are converted to variable path names that are unique to the computer (i.e., machine dependent to that particular computerized device on which the machine independent path names are decoded into variable path names) on which the file compilation process is executed.

Figure 7:
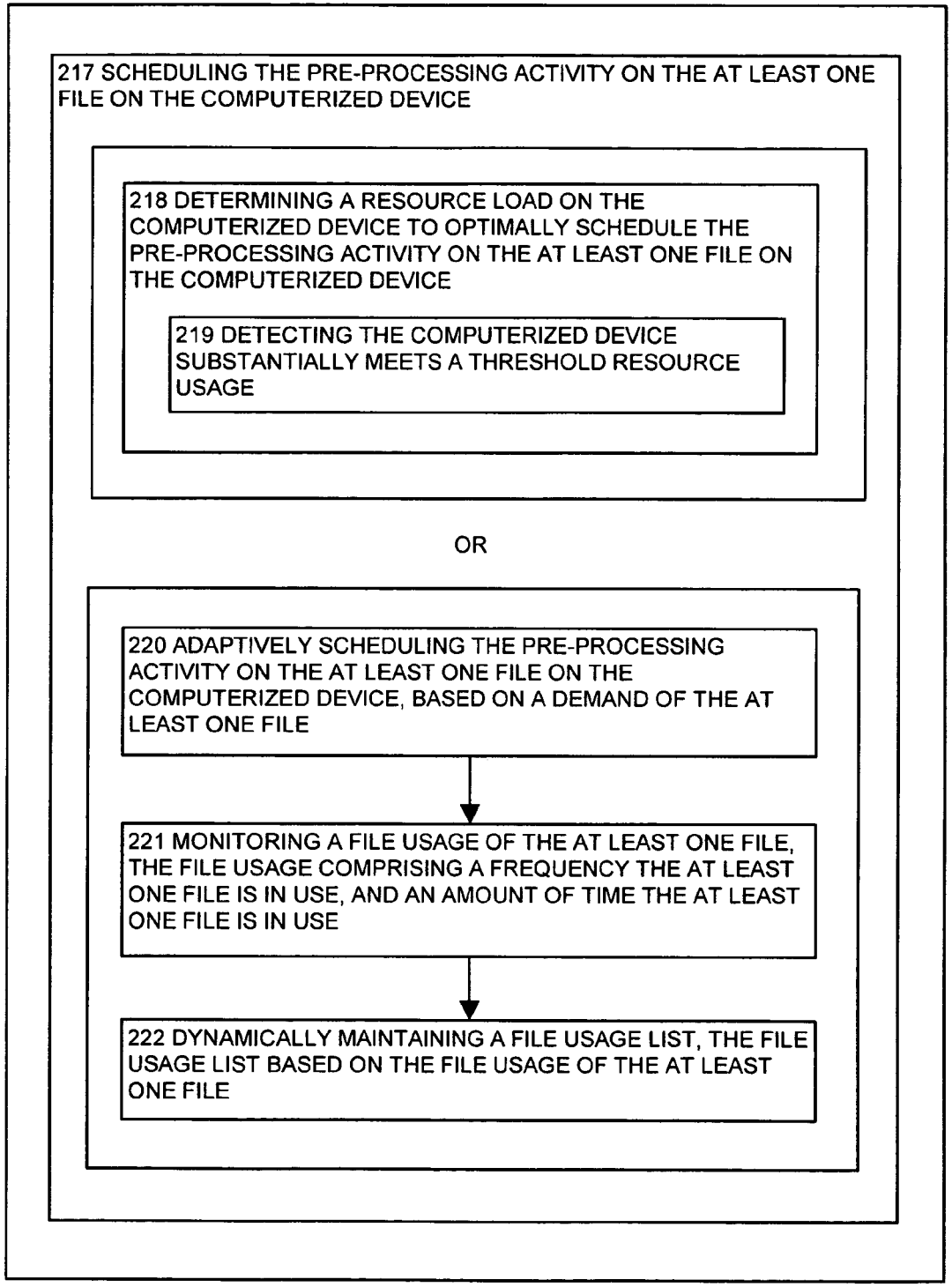
FIG. 7 illustrates a flowchart of a procedure performed by the system of FIG. 1 when the scheduling process schedules the pre-processing activity on the file requiring a pre-processing activity on the computerized device, according to one embodiment disclosed herein.

FIG. 7 is a flowchart of the steps performed by the scheduling process 140-2 when it schedules the pre-processing activity on the at least one file on the computer system 110. The scheduling process 140-2 takes into account both the resource load on the computer system 110 as well as the file usage of the files requiring a pre-processing activity 160-N.

In step 218, the scheduling process 140-2 determines a resource load on the computer system 110 to optimally schedule the pre-processing activity on the at least one files requiring a pre-processing activity 160-1 on the computer system 110. The scheduling process 140-2 schedules the pre-processing activity on the files requiring a pre-processing activity 160-N at a time when the pre-processing activity will not conflict with other processing work the CPU is performing.

In step 219, the scheduling process 140-2 detects the computer system 110 substantially meets a threshold resource usage. The scheduling process 140-2 determines when the CPU is not too busy processing other programs to perform the pre-processing activity, by establishing a resource threshold level. Once the resource load on the CPU has dipped below the resource threshold level, the scheduling process 140-2 schedules the pre-processing activity on the files requiring a pre-processing activity 160-N. The scheduling process 140-2 could also adaptively change the resource threshold level, based on the resource load on the computer system 110. In one embodiment, the scheduling process 140-2 monitors the processing load pauses the pre-processing if the load (other than that from pre-processing) rises above threshold.

Alternatively, in step 220, the scheduling process 140-2 adaptively schedules the pre-processing activity on the at least one file requiring a pre-processing activity 160-1 on the computer system 110, based on a demand of the file requiring a pre-processing activity 160-1. The scheduling process 140-2 determines the order in which the files requiring a pre-processing activity 160-N are processed, depending on which application (that accesses the files requiring a pre-processing activity 160-N) is most likely to be accessed first.

In step 221, the scheduling process 140-2 monitors a file usage of the at least one file, the file usage comprising a frequency the file is in use, and an amount of time the file is in use. The scheduling process 140-2 monitors the usage of the files requiring a pre-processing activity 160-N to gauge how often the application (that invokes the files requiring a pre-processing activity 160-N) is opened, and how long that application is in use on the computer system 110.

In step 222, the scheduling process 140-2 dynamically maintains a file usage list, the file usage list based on the file usage of the file. The scheduling process 140-2 monitors the file usage of files requiring a pre-processing activity 160-N, and maintains that list, dynamically changing the list, depending on any changes in the file usage of the files requiring a pre-processing activity 160-N.

Figure 8:
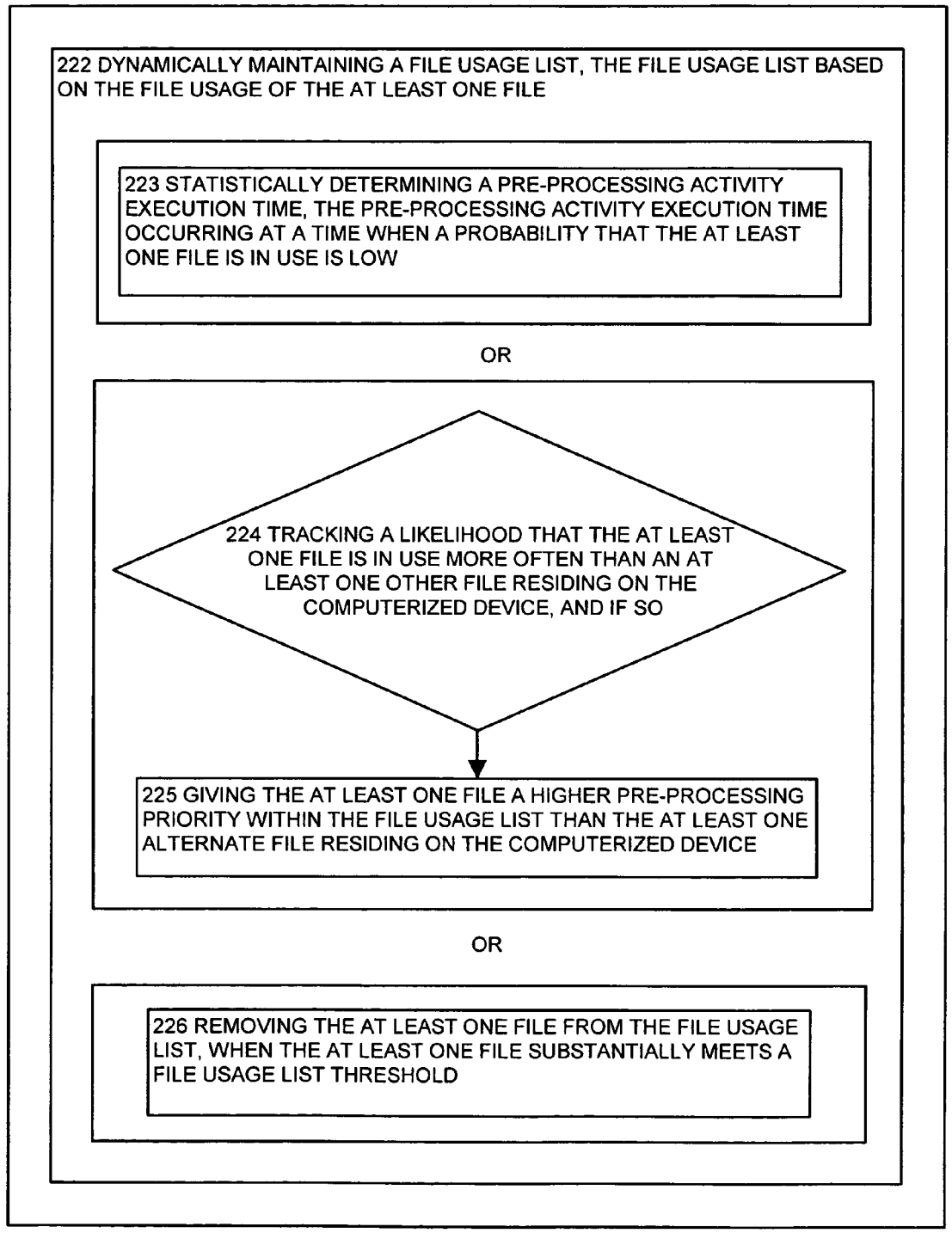
FIG. 8 illustrates a flowchart of a procedure performed by the system of FIG. 1 when the scheduling process dynamically maintains a file usage list, the file usage list based on the file usage of the at least one file requiring pre-processing activity, according to one embodiment disclosed herein.

FIG. 8 is a flowchart of the steps performed by the scheduling process 140-2 when it dynamically maintains a file usage list, the file usage list based on the file usage of the at least one file. The scheduling process 140-2 monitors the file usage of the applications accessing the files requiring a pre-processing activity 160-N, and dynamically maintains that list, modifying it as the file usage of the applications (accessing the files requiring a pre-processing activity 160-N) changes.

In step 223, the scheduling process 140-2 statistically determines a pre-processing activity scheduling time, the pre-processing activity scheduling time occurring at a time when a probability that the at least one file is in use is low. The scheduling process 140-2 determines when to schedule the pre-processing activity on the files requiring a pre-processing activity 160-N based on the probability that the files requiring a pre-processing activity 160-N are not in use at the time the pre-processing activity is scheduled. In one embodiment, the scheduling process 140-2 determines the at least one file is not in use and begins to perform the pre-processing activity 160-N on the at least one file.

Alternatively, in step 224, the scheduling process 140-2 tracks a likelihood that the at least one file is in use more often than an at least one other file residing on the computer system 110. Within the dynamically maintained file usage list, the scheduling process 140-2 determines which file within the group of files requiring a pre-processing activity 160-N is likely to be in use more often than another file within the group of files requiring a pre-processing activity 160-N.

In step 225, the scheduling process 140-2 gives the at least one file a higher pre-processing priority within the file usage list than the at least one alternate file residing on the computer system 110. If the scheduling process 140-2 determines that a file within the group of files requiring a pre-processing activity 160-N is likely to be in use more often than another file within the group of files requiring a pre-processing activity 160-N, the file most likely to be accessed, will be given a higher pre-processing priority on the dynamically maintained file usage list.

Alternatively, in step 226, the scheduling process 140-2 removes the at least one file from the file usage list, when the at least one file substantially meets a file usage list threshold. The scheduling process 140-2 dynamically maintains the file usage list by changing the order of priority on the list, and also by removing files from the list when those files dip below a file usage list, as determined by the scheduling process 140-2.

Figure 9:
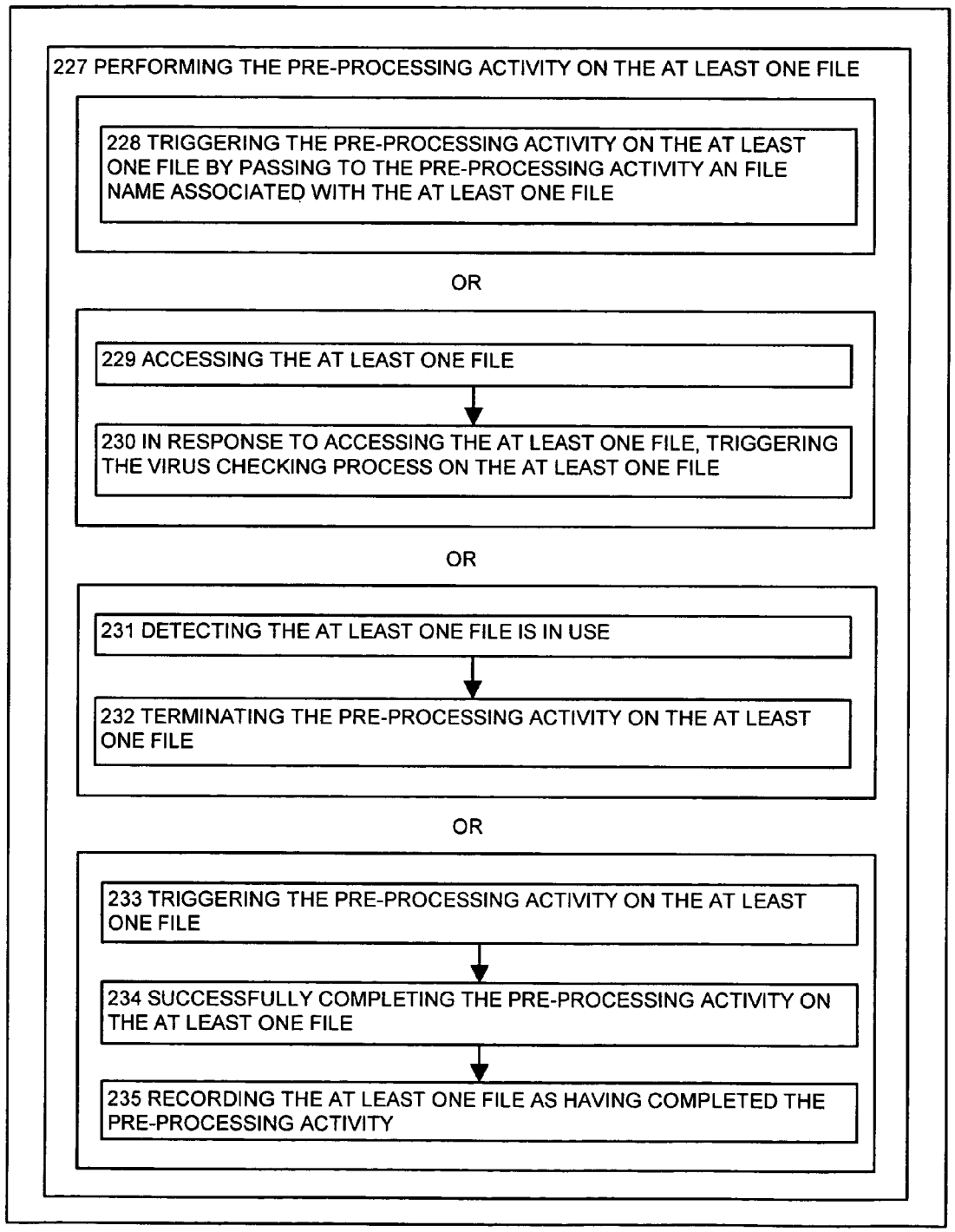
FIG. 9 illustrates a flowchart of a procedure performed by the system of FIG. 1 when the scheduling process performs the pre-processing activity on the at least one file requiring pre-processing activity, according to one embodiment disclosed herein.

FIG. 9 is a flowchart of the steps performed by the scheduling process 140-2 when it performs the pre-processing activity on the at least one file. After the scheduling process 140-2 identifies the files requiring a pre-processing activity 160-N, and schedules the pre-processing activity, the pre-processing activity is performed on the files requiring a pre-processing activity 160-N.

In step 228, the scheduling process 140-2 triggers the pre-processing activity on the at least one file by passing to the pre-processing activity, a file name associated with the file. For example, in the case of a virus scanning process, the scheduling process 140-2 invokes the virus scanning process by passing the name of the file requiring a pre-processing activity 160-1 to the virus scanning process.

Alternatively, in step 229, the scheduling process 140-2 accesses the at least one file. In one embodiment, the pre-processing activity is a virus checking process, and the virus checking process accesses the files requiring a pre-processing activity 160-N to scan the file for viruses.

In step 230, the scheduling process 140-2, in response to accessing the at least one file, triggers the virus checking process on the at least one file. The virus checking is performed on one of the files requiring a pre-processing activity 160-1.

Alternatively, in step 231, the scheduling process 140-2 detects the at least one file is in use. In one embodiment, the scheduling process 140-2 attempts to perform the pre-processing activity on one of the files requiring a pre-processing activity 160-1, and determines the file requiring a pre-processing activity 160-1 is already in use.

In step 232, the scheduling process 140-2 terminates the pre-processing activity on the at least one file. If the scheduling process 140-2 determines the files requiring a pre-processing activity 160-1 is already in use, the scheduling process 140-2 terminates the pre-processing activity on that file. The file requiring a pre-processing activity 160-1 is recorded as not having successfully completed the pre-processing activity.

Alternatively, in step 233, the scheduling process 140-2 triggers the pre-processing activity on the at least one file. In one embodiment, the scheduling process 140-2 triggers the pre-processing activity on one of the files requiring a pre-processing activity 160-1. The file requiring a pre-processing activity 160-1 is not in use, and is available to have the pre-processing activity performed.

In step 234, the scheduling process 140-2 successfully completes the pre-processing activity on the at least one file. For example, the pre-processing activity could be a virus scanning process. In this embodiment, the virus scanning process successfully completes scanning the file requiring a pre-processing activity 160-1 for viruses.

In step 235, the scheduling process 140-2 records the at least one file as having completed the pre-processing activity. When the pre-processing activity has been completed on the files requiring a pre-processing activity 160-N, the scheduling process 140-2 records the files requiring a pre-processing activity 160-N as having completed the pre-processing activity. This information contributes to the dynamically changing file usage list.

In one embodiment, the scheduling process 140-2 constantly monitors all files on the computerized device that get accessed by each application, to identify the at least one file requiring pre-processing activity 160-N.

In one configuration, the scheduling process begins operation of scheduling the pre-processing activity at a predetermined time after boot-up of the computer. For example, the scheduling process may wait 3, 4 or 5 minutes (or any other amount of time), and then begin operation of the pre-processing activity, one file at a time, in a low priority mode so that the pre-processing activity does not interfere too heavily with other processes executing on the computerized device. One purpose for waiting a predetermined amount of time is to allow other background processes that may have been started upon boot-up of the computerized device to complete, before the pre-processing activity is initiated. Thus by beginning shortly after boot-up, but after other background processes have been completed (for example by the operating system), the pre-processing activity will have the most amount of time available to complete its task prior to a user launching the application that requires access to the files upon which the pre-processing activity is performed. In this manner, this configuration attempts to get the pre-processing completed before the user uses the application of interest.

In another configuration, the scheduler can determine a typical or common launch sequence of different applications that the user frequently uses and can perform pre-processing as explained above for different applications in accordance with their typical launch or use order. For example, if a user typically launches email, and then reads emails, and thereafter typically launches a word processor, the scheduler explained herein can identify this usage pattern and can apply pre-processing such as virus checking to email files first, and then to the word processor files, in an attempt to shorten the launch time of both applications. Thus the system disclosed herein performs the pre-processing activity to minimize a performance impact of launching an application on the computerized device when the user desires to use that application, since the pre-processing activity can be complete (either wholly or at least in part) prior to the user invoking the application.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. A method of performing a pre-processing activity, the method comprising:

identifying at least one file in a set of files, the set of files defined by a plurality of file names comprised of a variable path file name and a fixed path file name, the at least one file requiring pre-processing activity, the pre-processing activity being a virus checking process;

converting the plurality of file names to a plurality of machine independent path names usable to at least one other computer, converting including:
  computing a plurality of unique file path names from a plurality of file identities, the unique file path names indicating file path names that are unique to a computerized device; and
  stripping the variable path file name from each of the plurality of unique file path names to create a plurality of fixed path file names that are not unique to the computerized device, the set of files requiring a pre-processing activity to be performed prior to the set of files being accessed by an application operating on the computerized device;
scheduling the pre-processing activity on the set of files prior to receiving an invocation of the application that accesses the set of files, the pre-processing activity scheduled to minimize a performance impact on the computerized device, scheduling the pre-processing activity including monitoring a file usage that identifies a frequency that the at least one file is in use by the application, and scheduling the pre-processing activity including monitoring a file usage that identifies an amount of time the at least one file is in use during execution of the application;
adaptively scheduling the pre-processing activity on the at least one file based on the file usage of the at least one file;
performing the pre-processing activity on the set of files in accordance with the scheduling;
storing an indication that pre-processing is complete in association with the at least one file;
receiving an invocation of an application that during execution, requires access to the at least one file;
in response to identifying the indication for the at least one file that pre-processing activity is complete, executing the application without requiring performance of the pre-processing activity; and
wherein adaptively scheduling the pre-processing activity comprises:
  determining a pre-processing activity execution time, the pre-processing activity execution time occurring at a time when a probability that the at least one file is in use is low based on the file usage of the at least one file.

2. The method of claim 1 wherein identifying the at least one file requiring a pre-processing activity comprises:
  identifying a plurality of associated files that are accessed by at least one software application during execution of the at least one software application in the computerized device.

3. The method of claim 2 wherein identifying a plurality of associated files comprises:
  installing the at least one software application on the computerized device;
  executing the at least one software application on the computerized device;
  monitoring the execution of the at least one software application; and
  recording a plurality of file identities that are accessed during the execution of the at least one software application.

4. The method of claim 3 wherein installing, executing, monitoring, and recording are performed on a first computerized device; and
wherein scheduling the pre-processing activity and performing the pre-processing activity are performed on a second computerized device.

5. The method of claim 3 comprising:
  executing a file filtering process on the plurality of file identities that are accessed during the execution of the at least one software application, the file filtering process converting the plurality of file identities to a plurality of machine independent path and file names usable to at least one other computer on which the software application is installed.

6. The method of claim 2 wherein identifying a plurality of associated files comprises:
  generating a file compilation process operable to identify files accessed during execution of the application on the computerized device; and
  executing the file compilation process to configure the pre-processing activity with the identity of files accessed during execution of the application on the computerized device.

7. The method of claim 6 wherein executing the file compilation process comprises:
  receiving a plurality of fixed path file names; and
  decoding the plurality of fixed path file names to create a plurality of device unique path names indicating file path names that are unique to the computerized device upon which the application is installed.

8. The method of claim 1 wherein scheduling the pre-processing activity on the at least one file comprises:
  determining a resource load on the computerized device; and
  detecting that the resource load on the computerized device substantially meets a threshold resource usage that supports scheduling of the pre-processing activity on the at least one file on the computerized device to minimize a performance impact on the computerized device.

9. The method of claim 1 wherein monitoring a file usage comprises:
  tracking a likelihood that the at least one file is in use more often than at least one other file, and if so, assigning the at least one file a higher pre-processing priority within the file usage than the at least one other file.

10. The method of claim 1 wherein performing the pre-processing activity on the at least one file comprises:
  for each of the at least one file, triggering the pre-processing activity on the at least one file by passing to the pre-processing activity a file name associated with the at least one file.

11. The method of claim 10 wherein triggering the pre-processing activity on the at least one file comprises:
  accessing the at least one file; and
  in response to accessing the at least one file, applying the virus checking process on the at least one file.

12. The method of claim 11 wherein applying the virus checking process comprises:
  operating the virus checking process in a low-priority mode within the computerized device to minimize performance impact of the virus checking process on other processes operating within the computerized device.

13. The method of claim 1 wherein performing the pre-processing activity on the at least one file comprises:
  triggering the pre-processing activity on the at least one file in a low priority mode within the computerized device;
  successfully completing the pre-processing activity on the at least one file; and
  storing an indication that pre-processing is complete in association with the at least one file.

14. The method of claim 13 comprising:

receiving an invocation of an application that during execution, requires access to the at least one file; and identifying the indication for the at least one file that pre-processing activity is complete and in response, executing the application without requiring performance of the pre-processing activity.

15. A computerized device comprising:

a memory;

a processor;

a communications interface;

an interconnection mechanism coupling the memory, the processor and the communications interface;

wherein the memory is encoded with a scheduling application that when executed on the processor performs a pre-processing activity in the computerized device by performing the operations of:

identifying at least one file, the at least one file requiring a pre-processing activity to be performed prior to the at least one file being accessed by an application operating on a computerized device, the pre-processing activity being a virus checking process;

scheduling the pre-processing activity on the at least one file prior to receiving an invocation of the application that accesses the at least one file, the pre-processing activity scheduled to minimize a performance impact on the computerized device, scheduling the pre-processing activity including monitoring a file usage that identifies a frequency that the at least one file is in use by the application, and scheduling the pre-processing activity including monitoring a file usage that identifies an amount of time the at least one file is in use during execution of the application;

adaptively scheduling the pre-processing activity on the at least one file based on the file usage of the at least one file;

performing the pre-processing activity on the at least one file in accordance with the scheduling, scheduling the pre-processing activity on the at least one file comprising:

determining a resource load on the computerized device;

detecting that the resource load on the computerized device substantially meets a threshold resource usage that supports scheduling of the pre-processing activity on the at least one file on the computerized device to minimize a performance impact on the computerized device; and wherein adaptively scheduling the pre-processing activity comprises:

determining a pre-processing activity execution time, the pre-processing activity execution time occurring at a time when a probability that the at least one file is in use is low based on the file usage of the at least one file.

16. The computerized device of claim 15 wherein when the computerized device performs the operation of identifying the at least one file requiring a pre-processing activity on the computerized device, the computerized device performs the operation of:

identifying a plurality of associated files invoked by at least one software application during execution of the at least one software application residing on the computerized device.

17. The computerized device of claim 16 wherein when the computerized device performs the operation of identifying a plurality of associated files, the computerized device performs the operations of:

installing the at least one software application on the computerized device;

executing the at least one software application on the computerized device;

monitoring the execution of the at least one software application; and recording a plurality of file identities that are accessed during the execution of the at least one software application.

18. The computerized device of claim 15 wherein when the computerized device performs the operation of performing the pre-processing activity on the at least one file, the computerized device performs the operation of:

for each of the at least one file, triggering the pre-processing activity on the at least one file by passing to the pre-processing activity a file name associated with the at least one file.

19. The computerized device of claim 17 wherein the pre-processing activity is a virus checking process and wherein when the computerized device performs the operation of triggering the pre-processing activity, the computerized device performs the operations of:

accessing the at least one file; and in response to accessing the at least one file, applying the virus checking process on the at least one file.

20. The computerized device of claim 15 wherein when the computerized device performs the operation of performing the pre-processing activity on the at least one file, the computerized device performs the operations of:

triggering the pre-processing activity on the at least one file in a low priority mode within the computerized device;

successfully completing the pre-processing activity on the at least one file; and storing an indication that pre-processing is complete in association with the at least one file.

21. The computerized device of claim 15 wherein the computerized device performs the operations of:

receiving an invocation of an application that during execution, requires access to the at least one file; and identifying the indication for the at least one file that pre-processing activity is complete and in response, executing the application without requiring performance of the pre-processing activity.

22. A computer readable storage medium encoded with computer programming instructions that when executed by a processor in a computerized device produces a scheduling process that performs a pre-processing activity by causing the computerized device to perform the operations of:

identifying a set of files, the set of files defined by a plurality of file names comprised of a variable path file name and a fixed path file name, the at least one file requiring pre-processing activity, the pre-processing activity being a virus checking process;

converting the plurality of file names to a plurality of machine independent path names usable to at least one other computer converting including comprises:

computing a plurality of unique file path names from a plurality of file identities, the unique file path names indicating file path names that are unique to a computerized device; and stripping the variable path file name from each of the plurality of unique file path names to create a plurality of fixed path file names that are not unique to the computerized device the set of files requiring a pre-processing activity to be performed prior to the set of files being accessed by an application operating on the computerized device;

scheduling the pre-processing activity on the set of files prior to receiving an invocation of the application that accesses the set of files, the pre-processing activity scheduled to minimize a performance impact on the computerized device, scheduling the pre-processing activity including monitoring a file usage that identifies a frequency that the at least one file is in use by the application, and scheduling the pre-processing activity including monitoring a file usage that identifies an amount of time the at least one file is in use during execution of the application;

adaptively scheduling the pre-processing activity on the at least one file based on the file usage of the at least one file;

performing the pre-processing activity on the set of files in accordance with the scheduling, scheduling the pre-processing activity on the set of files further comprising:
 determining a resource load on the computerized device;
 detecting that the resource load on the computerized device substantially meets a threshold resource usage that supports scheduling of the pre-processing activity on the set of files on the computerized device to minimize a performance impact on the computerized device; and wherein adaptively scheduling the pre-processing activity comprises:
 determining a pre-processing activity execution time, the pre-processing activity execution time occurring at a time when a probability that the at least one file is in use is low based on the file usage of the at least one file.

23. The method of claim 1 further comprising:
 detecting, by a scheduling process, an attempt to invoke an application having files that require pre-processing;
 receiving, from a file compilation process, an indication of the files requiring pre-processing;
 confirming completion of pre-processing of the files that require pre-processing; and
 invoking, by the scheduling process, the application.

24. The method of claim 1 further comprising, upon detecting that the resource load meets the threshold resource usage:
 pausing the pre-processing activity; and
 commencing the pre-processing activity when the processing load drops below the threshold resource usage.

25. The method of claim 1, further comprising:
 scheduling the pre-processing activity to begin at a predetermined time after boot-up of the computerized device; and
 in response to completion of the predetermined time, initiating the virus checking process, one file at a time, in a low-priority mode.

26. The method of claim 23, further comprising:
 determining a common launch sequence of different applications frequently accessed on the computerized device; and
 executing the pre-processing activity in accordance with the common launch sequence of the different applications.

\* \* \* \* \*